(12) United States Patent
Okada et al.

(10) Patent No.: US 11,642,968 B2
(45) Date of Patent: May 9, 2023

(54) ON-BOARD EQUIPMENT DIAGNOSTICS DEVICE, VEHICLE EQUIPPED WITH ON-BOARD EQUIPMENT DIAGNOSTICS DEVICE, ON-BOARD EQUIPMENT DIAGNOSTICS METHOD, AND NON-TRANSITORY RECORDING MEDIUM

(71) Applicant: TOYOTA JIDOSHA KABUSHIKI KAISHA, Toyota (JP)

(72) Inventors: Tetsuaki Okada, Toyota (JP); Satoshi Kawashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/655,868

(22) Filed: Mar. 22, 2022

(65) Prior Publication Data
US 2022/0363135 A1 Nov. 17, 2022

(30) Foreign Application Priority Data

May 14, 2021 (JP) .............................. JP2021-082605

(51) Int. Cl.
| | |
|---|---|
| *B60L 3/00* | (2019.01) |
| *B60L 58/14* | (2019.01) |
| *H02J 7/00* | (2006.01) |
| *B60R 16/033* | (2006.01) |

(52) U.S. Cl.
CPC .......... *B60L 3/0046* (2013.01); *B60L 3/0084* (2013.01); *B60L 58/14* (2019.02); *B60R 16/033* (2013.01); *H02J 7/0047* (2013.01); *H02J 2310/40* (2020.01)

(58) Field of Classification Search
None
See application file for complete search history.

(56) References Cited

U.S. PATENT DOCUMENTS

| | | | |
|---|---|---|---|
| 10,351,084 B2 * | 7/2019 | Maruyama | .............. B60R 16/03 |
| 2009/0184700 A1 * | 7/2009 | Kanayama | ............ H02M 3/158 |
| | | | 323/282 |
| 2012/0056478 A1 * | 3/2012 | Omoto | .................... B60L 58/10 |
| | | | 307/11 |
| 2012/0065827 A1 * | 3/2012 | Kimura | ................... B60L 58/18 |
| | | | 903/903 |
| 2016/0248262 A1 | 8/2016 | Maruyama | |
| 2017/0106820 A1 | 4/2017 | Maruyama et al. | |

FOREIGN PATENT DOCUMENTS

| | | |
|---|---|---|
| CN | 106660497 A | 5/2017 |
| JP | 6200286 B2 | 9/2017 |
| JP | 6374248 B2 | 8/2018 |
| JP | 6408843 B2 | 10/2018 |

* cited by examiner

*Primary Examiner* — Jared Fureman
*Assistant Examiner* — Aqeel H Bukhari
(74) *Attorney, Agent, or Firm* — Oblon, McClelland, Maier & Neustadt, L.L.P.

(57) ABSTRACT

At least one power line is connected to a battery mounted at a vehicle. Plural ECUs are each connected to the at least one power line. A processor switches one ECU at a time of the plural ECUs from a second state to a first state by sending state switching signals to the plural ECUs. A power line to which plural ECUs are connected is a target power line. On the basis of current values of the target power line measured by a current measurement section when these plural ECUs are switched to the first state one at a time, the processor determines whether or not each ECU is in an abnormal condition.

13 Claims, 10 Drawing Sheets

FIG.7

|  | THRESHOLD |
|---|---|
| CURRENT VALUE OF FIRST POWER LINE | FIRST THRESHOLD |
| SUM OF CURRENT VALUES OF FIRST POWER LINE AND SECOND POWER LINE | SECOND THRESHOLD |

FIG.8

| PRIORITY SEQUENCE / POWER LINE | 1 | 2 | 3 |
|---|---|---|---|
| FIRST POWER LINE | 20-1 | 20-2 | |
| SECOND POWER LINE | 20-4 | 20-3 | 20-5 |
| THIRD POWER LINE | 20-7 | 20-6 | |
| FOURTH POWER LINE | 20-8 | 20-9 | |

FIG.9

| | THRESHOLD |
|---|---|
| ECU 20-1 ~ 20-5 | FIFTH THRESHOLD |
| ECU 20-6 ~ 20-9 | SIXTH THRESHOLD |

ON-BOARD EQUIPMENT DIAGNOSTICS DEVICE, VEHICLE EQUIPPED WITH ON-BOARD EQUIPMENT DIAGNOSTICS DEVICE, ON-BOARD EQUIPMENT DIAGNOSTICS METHOD, AND NON-TRANSITORY RECORDING MEDIUM

CROSS-REFERENCE TO RELATED APPLICATION

This application is based on and claims priority under 35 USC 119 from Japanese Patent Application No. 2021-082605 filed on May 14, 2021, the disclosure of which is incorporated by reference herein.

BACKGROUND

Technical Field

The present disclosure relates to an on-board equipment diagnostics device, a vehicle equipped with the on-board equipment diagnostics device, an on-board equipment diagnostics method, and a non-transitory recording medium.

Related Art

Japanese Patent No. 6,408,843 discloses an on-board equipment diagnostics device that is provided with a battery provided in a vehicle, electric power lines connected to the battery. ECUs connected to the power lines, a bus connected with the ECUs, and a control device connected with the power lines and the bus.

The control device of this on-board equipment diagnostics device determines whether or not an ECU connected to a power line is in an abnormal condition on the basis of the magnitude of a dark current flowing in the power line. More specifically, the control device makes a determination based on the magnitude of the dark current as to whether an ECU, which is determined by the control device to be in a sleep state on the basis of signals sent from the ECU to the bus, is actually in a wake state.

When one of plural ECUs connected to a single power line is in an abnormal condition, the control device according to Japanese Patent No. 6,408,843 can determine that at least one of the ECUs connected to the power line is in an abnormal condition. However, the control device cannot identify the ECU(s) in the abnormal condition(s).

SUMMARY

In consideration of the circumstances described above, an object of the present disclosure is to provide an on-board equipment diagnostics device, a vehicle equipped with the on-board equipment diagnostics device, an on-board equipment diagnostics method, and a non-transitory recording medium that, when an ECU among plural ECUs connected to a single power line is in an abnormal condition, can identify the ECU that is in the abnormal condition.

An on-board equipment diagnostics device according to a first aspect of the present disclosure includes: a current measurement section that measures a current value of at least one power line connected to a battery mounted at a vehicle; and a processor. The processor is configured to: by sending a state switching signal to a plurality of ECUs that are each connected to a corresponding power line of the at least one power line, switch one ECU at a time from a second state to a first state; and determine whether or not each ECU is in an abnormal condition based on current values of a target power line to which the ECU is connected, measured by the current measurement section when ECUs connected to the target power line are switched to the first state one at a time, each target power line being one of the at least one power line.

The processor of the on-board equipment diagnostics device according to the first aspect of the present disclosure switches one ECU at a time from the second state to the first state by sending the state switching signals to the plural ECUs that are each connected to the corresponding power line among the at least one power line connected to the battery mounted at the vehicle. The current measurement section measures current values of each power line.

On the basis of current values of the target power line measured by the current measurement section when ECUs connected to the target power line are switched to the first state one at a time, which is one of the at least one power line, is switched into the first state by the processor, the processor determines whether or not each ECU is in an abnormal condition. Thus, when any of plural ECUs connected to one power line is in an abnormal condition, the on-board equipment diagnostics device according to the first aspect of the present disclosure can identify the ECU(s) in the abnormal condition(s).

In an on-board equipment diagnostics device according to a second aspect of the present disclosure, in the first aspect, each ECU connected to the target power line is switchable between a wake state that is the first state and a sleep state that is the second state, power consumption being less in the sleep state than in the wake state.

In the second aspect of the present disclosure, when any of plural ECUs that are connected to one power line and are switchable between the wake state and the sleep state is in an abnormal condition, the on-board equipment diagnostics device can identify the ECU(s) in the abnormal condition(s).

In an on-board equipment diagnostics device according to a third aspect of the present disclosure, in the first aspect, each ECU connected to the target power line is switchable between an idle state that is the first state and a non-idle state that is the second state, power consumption being greater in the non-idle state than in the idle state.

In the third aspect of the present disclosure, when any of plural ECUs that are connected to one power line and are switchable between the idle state and the non-idle state is in an abnormal condition, the on-board equipment diagnostics device can identify the ECU(s) in the abnormal condition(s).

In an on-board equipment diagnostics device according to a fourth aspect of the present disclosure, in the first aspect, the processor is configured to determine that a target ECU, which is the one of the ECUs connected to the target power line, is in an abnormal condition when an amount of change in current values of the target power line when the state switching signal is sent to the target ECU is less than a predetermined ECU diagnostics threshold.

In the fourth aspect of the present disclosure, when a state switching signal is sent to the target ECU that is one of the ECUs connected to the target power line and an amount of change in current values of the target power line is less than the ECU diagnostics threshold, the processor determines that the target ECU is in an abnormal condition. Thus, in the on-board equipment diagnostics device according to the fourth aspect of the present disclosure, when any of plural ECUs connected to one power line is in an abnormal condition, the ECU(s) in the abnormal condition(s) can be identified accurately.

In an on-board equipment diagnostics device according to a fifth aspect of the present disclosure, in the first aspect: each ECU connected to the target power line is switchable between a wake state that is the first state and a sleep state that is the second state, power consumption being less in the sleep state than in the wake state; the processor is configured to determine whether or not there is an abnormality relating to current values at the target power line on the basis of current values measured by the current management section, and, when the processor determines that there is an abnormality relating to current values at the target power line, the processor is configured to determine whether or not each ECU connected to the target power line is in an abnormal condition.

In the fifth aspect of the present disclosure, on the basis of current values measured by the current measurement section, the processor determines whether or not there is an abnormality relating to current values at the target power line. Then, for each ECU connected to the target power line that is determined to have an abnormality relating to current values, the processor determines whether or not the ECU is in an abnormal condition. Thus, in the on-board equipment diagnostics device according to the fifth aspect of the present disclosure, when any of plural ECUs connected to a target power line with an abnormality relating to current values is in an abnormal condition, the ECU(s) in the abnormal condition(s) can be identified accurately.

In an on-board equipment diagnostics device according to a sixth aspect of the present disclosure, the fifth aspect further includes at least one bus connected to the plurality of ECUs, and the processor is configured to: determine whether each ECU is in the first state or the second state on the basis of a signal sent from the ECU via the bus; and, when each ECU connected to one power line is determined to be in the second state and a current value of the target power line is greater than a predetermined power line diagnostics threshold, determine that there is an abnormality relating to current values at the target power line.

In the sixth aspect of the present disclosure, the processor determines whether each ECU is in the first state or the second state on the basis of signals sent from the ECU via the bus. Then, for a power line at which all of the ECUs connected to the power line are determined to be in the second state and the current value is larger than the power line diagnostics threshold, the processor determines that the power line is a target power line with an abnormality relating to current values. Thus, when plural power lines are present, the on-board equipment diagnostics device according to the sixth aspect of the present disclosure can accurately identify which of the power lines is to be a target power line.

In an on-board equipment diagnostics device according to a seventh aspect of the present disclosure, in the first aspect, a priority sequence is specified for the plural ECUs connected to the target power line, and the processor is configured to determine whether or not each of the plural ECUs is in an abnormal condition in accordance with the priority sequence.

In the seventh aspect of the present disclosure, the processor determines whether or not each ECU is in an abnormal condition in accordance with the priority sequence specified for the plural ECUs connected to the target power line. Thus, the on-board equipment diagnostics device according to the seventh aspect of the present disclosure can determine whether or not the plural ECUs connected to a target power line are in abnormal conditions in accordance with a priority sequence.

In an on-board equipment diagnostics device according to an eighth aspect of the present disclosure, in the first aspect, when the one ECU is determined by the processor to be in an abnormal condition, the processor is configured to reset the one ECU in accordance with a reset process specified for the corresponding power line.

In the eighth aspect of the present disclosure, the processor resets each ECU determined by the processor to be in an abnormal condition in accordance with the reset process specified for the respective power line. Thus, the on-board equipment diagnostics device according to the eighth aspect of the present disclosure can reset each ECU that is determined by the processor to be in an abnormal condition.

In an on-board equipment diagnostics device according to a ninth aspect of the present disclosure, in the eighth aspect, after the one ECU is determined to be in the abnormal condition and is reset by the processor, the processor is configured to perform the determination and reset for another ECU connected to the same target power line as the ECU that has been reset.

In the ninth aspect of the present disclosure, when one or more of plural ECUs connected to a target power line is in an abnormal condition, neglect for a long period of an abnormal condition of an ECU determined to be in the abnormal condition is prevented.

In an on-board equipment diagnostics device according to a tenth aspect of the present disclosure, in the eighth aspect, when the one ECU connected to the target power line is determined to be in the abnormal condition by the processor, the processor is configured to reset every ECU connected to the target power line simultaneously.

In the tenth aspect of the present disclosure, when one or more of the plural ECUs connected to the target power line is in an abnormal condition, all the ECUs connected to the same target power line as the ECU in the abnormal condition are reset simultaneously by the processor. Thus, when plural ECUs connected to a target power line are actually in abnormal conditions, the on-board equipment diagnostics device according to the tenth aspect of the present disclosure can prevent neglect for a long period of abnormal conditions of an ECU determined by the processor to be in an abnormal condition and an ECU for which no determination has been made by the processor but that is actually in an abnormal condition.

A vehicle according to an eleventh aspect of the present disclosure is provided with the on-board equipment diagnostics device according to any of the first to tenth aspects.

An on-board equipment diagnostics method according to a twelfth aspect of the present disclosure includes a processor: by sending a state switching signal to a plurality of ECUs that are each connected to a corresponding power line of at least one power line connected to a battery mounted at a vehicle, switching one ECU at a time from a second state to a first state; and determining whether or not each ECU is in an abnormal condition based on current values of a target power line, to which the ECU is connected, when ECUs connected to the target power line are switched to the first state one at a time, each target power line being one of the at least one power line.

A non-transitory recording medium according to a thirteenth aspect of the present disclosure storing a program executable by a computer to execute processing including: by sending a state switching signal to a plurality of ECUs that are each connected to a corresponding power line of at least one power line connected to a battery mounted at a vehicle, switching one ECU at a time from a second state to a first state; and determining whether or not each ECU is in an abnormal condition based on current values of a target power line, to which the ECU is connected, when ECUs connected to the target power line are switched to the first state one at a time, each target power line being one of the at least one power line.

Advantageous Effects of Disclosure

As described above, the on-board equipment diagnostics device, the vehicle equipped with the on-board equipment diagnostics device, the on-board equipment diagnostics method, and the non-transitory recording medium according to the present disclosure provide an excellent effect in that, when an ECU among plural ECUs connected to a single power line is in an abnormal condition, the ECU that is in the abnormal condition can be identified.

BRIEF DESCRIPTION OF DRAWINGS

FIG. 7 is a diagram showing a power line diagnostics threshold map recorded in ROM of the ECU shown in FIG. 2.

FIG. 8 is a diagram showing a priority sequence map recorded in the ROM of the ECU shown in FIG. 2.

FIG. 9 is a diagram showing an ECU diagnostics threshold map recorded in the ROM of the ECU shown in FIG. 2.

DESCRIPTION OF EMBODIMENTS

Below, an exemplary embodiment of an on-board equipment diagnostics device 10 according to the present disclosure, a vehicle 12 equipped with the on-board equipment diagnostics device 10, an on-board equipment diagnostics method and a non-transitory recording medium is described with reference to the drawings.

Figure 1:
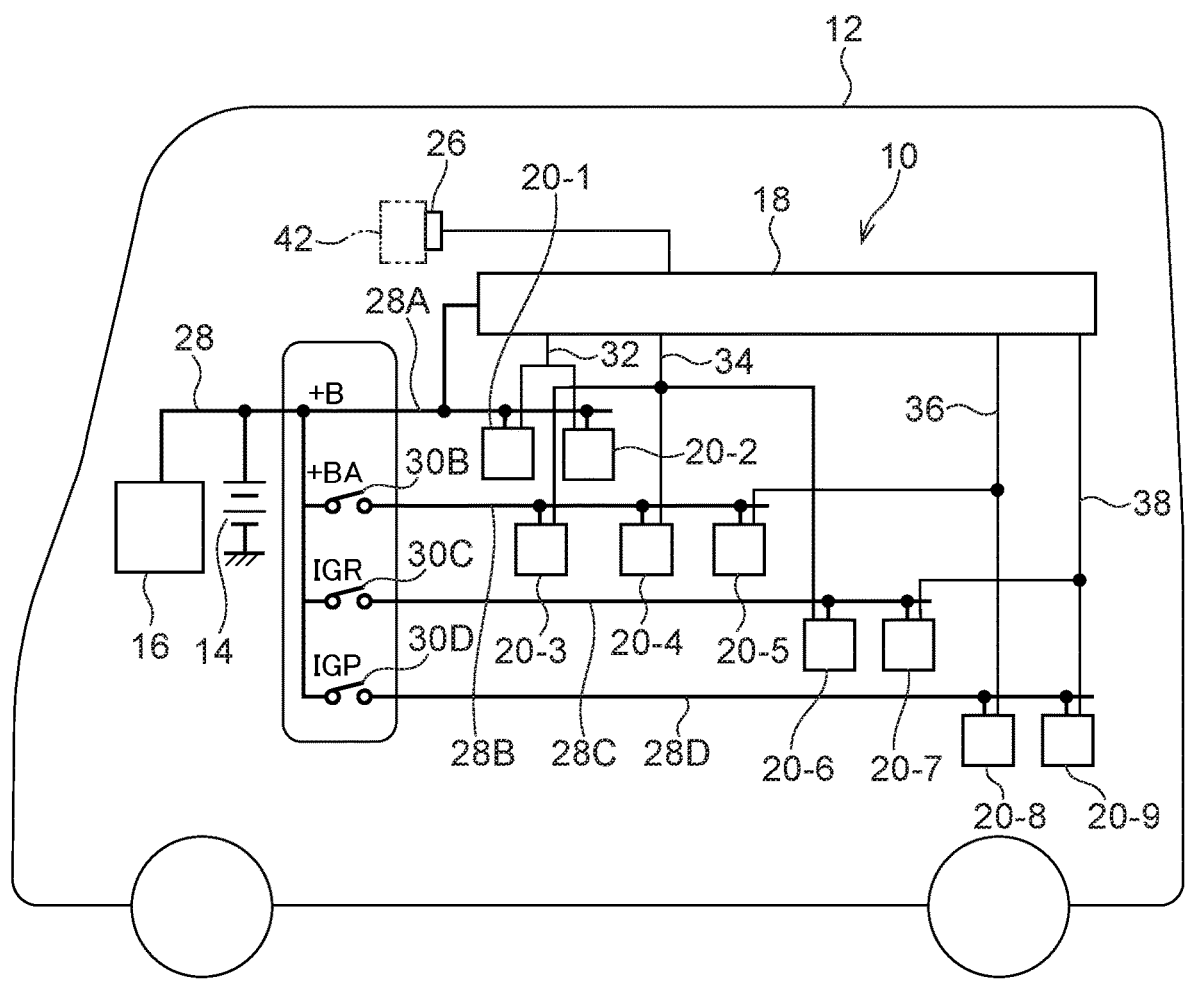
FIG. 1 is a schematic diagram of a vehicle equipped with an on-board equipment diagnostics device according to an exemplary embodiment.

FIG. 1 shows the vehicle 12 equipped with the on-board equipment diagnostics device 10 according to the exemplary embodiment (below referred to as "the diagnostics device 10"). The diagnostics device 10 is provided with a battery 14, a current sensor (a current measurement section) 16, an electronic control unit (ECU) 18, ECUs 20, a connector 26, power lines (harnesses) 28, a first bus 32, a second bus 34, a third bus 36 and a fourth bus 38. The ECUs 20 include ECUs 20-1, 20-2, 20-3, 20-4, 20-5, 20-6, 20-7, 20-8 and 20-9. That is, the ECUs 20 is a collective term for the ECUs 20-1, 20-2, 20-3, 20-4, 20-5, 20-6, 20-7, 20-8 and 20-9. The ECUs 20 are connected to control objects (not shown in the drawings), which are various devices provided at the vehicle 12, and control the control objects. The control objects include, for example, an engine, braking apparatus, steering apparatus, GPS receiver, audio equipment and lighting equipment. The battery 14, the current sensor 16, the ECU 18 and the ECUs 20 are connected to the power lines 28.

The power lines 28 include a first power line 28A, a second power line 28B, a third power line 28C and a fourth power line 28D. The ECU 18 is connected to the first power line 28A via (a portion of) the power lines 28. The ECU 20-1 and ECU 20-2 are also connected to the first power line 28A. The ECU 20-3, ECU 20-4 and ECU 20-5 are connected to the second power line 28B. The ECU 20-6 and ECU 20-7 are connected to the third power line 28C. The ECU 20-8 and ECU 20-9 are connected to the fourth power line 28D.

A switch 30B is provided on the second power line 28B, a switch 30C is provided on the third power line 28C, and a switch 30D is provided on the fourth power line 28D. The switch 30B, switch 30C and switch 30D are switchable between on positions and off positions. The switch 30B, switch 30C and switch 30D switch between the on positions and the off positions under the control of the ECU 18. Electric power from the battery 14 flows continuously into the first power line 28A. That is, the first power line 28A is connected to a constant power supply (+B). Under a state in which an ignition switch (a start switch, which is not shown in the drawings) of the vehicle 12 is positioned at an off position thereof, the ECU 18 switches the switch 30B to the on position, for example, when the ECU 18 detects that a distance between a smart key (not shown in the drawings) carried by an occupant of the vehicle 12 and the vehicle 12 is equal to or less than a predetermined distance. That is, the second power line 28B is connected to a power supply +BA. The third power line 28C is connected to a power source IGR. When the ignition switch is positioned at the on position thereof, the switch 30C is positioned at the on position thereof. One of the ECU 20-6 and ECU 20-7 which are connected to the third power line 28C is connected to, for example, the steering apparatus. The fourth power line 28D is connected to a power supply IGP. When the ignition switch is positioned at the on position thereof, the switch 30D is positioned at the on position thereof. One of the ECU 20-8 and ECU 20-9 which are connected to the fourth power line 28D is connected to, for example, the audio equipment.

The ECU 20-1 and ECU 20-2 are connected to the ECU 18 via the first bus 32. The ECU 20-3, ECU 20-4 and ECU 20-6 are connected to the ECU 18 via the second bus 34. The ECU 20-5 and ECU 20-8 are connected to the ECU 18 via the third bus 36. The ECU 20-7 and ECU 20-9 are connected to the ECU 18 via the fourth bus 38. A network including the ECU 18, the ECUs 20, the first bus 32, the second bus 34, the third bus 36 and the fourth bus 38 is, for example, a Controller Area Network (CAN), Ethernet (registered trademark) or FlexRay (registered trademark) network. The ECU 18 and ECUs 20 are capable of transmitting and receiving various kinds of information between one another via the first bus 32, the second bus 34, the third bus 36 and the fourth bus 38.

The ECUs 20-1, 20-2, 20-3, 20-4 and 20-5 are switchable, by transmission and reception of network management (NM) messages, between a wake state (an operational state) in which operations of control objects are controlled and a sleep state (a power conservation state) in which the control is paused. When each ECU 20 is in the sleep state, a transceiver 20G thereof, which is described below, operates. The ECUs 20-6, 20-7, 20-8 and 20-9 are switchable between a non-idle state (an operational state) in which operations of control objects are controlled and an idle state (a power conservation state) in which the control is paused. When each of the ECUs 20-6, 20-7, 20-8 and 20-9 is in the idle state, the transceiver 20G thereof that is described below operates. The wake state and the idle state are equivalent to a first state recited in the attached claims. The sleep state and the non-idle state are equivalent to a second state recited in the attached claims. A power consumption per unit time of each of the ECUs 20-1, 20-2, 20-3, 20-4 and 20-5 in the sleep state is smaller than a power consumption per unit time of the same in the wake state. A power consumption per unit time of each of the ECUs 20-6, 20-7, 20-8 and 20-9 in the idle state is smaller than a power consumption per unit time of the same in the non-idle state.

Figure 2:
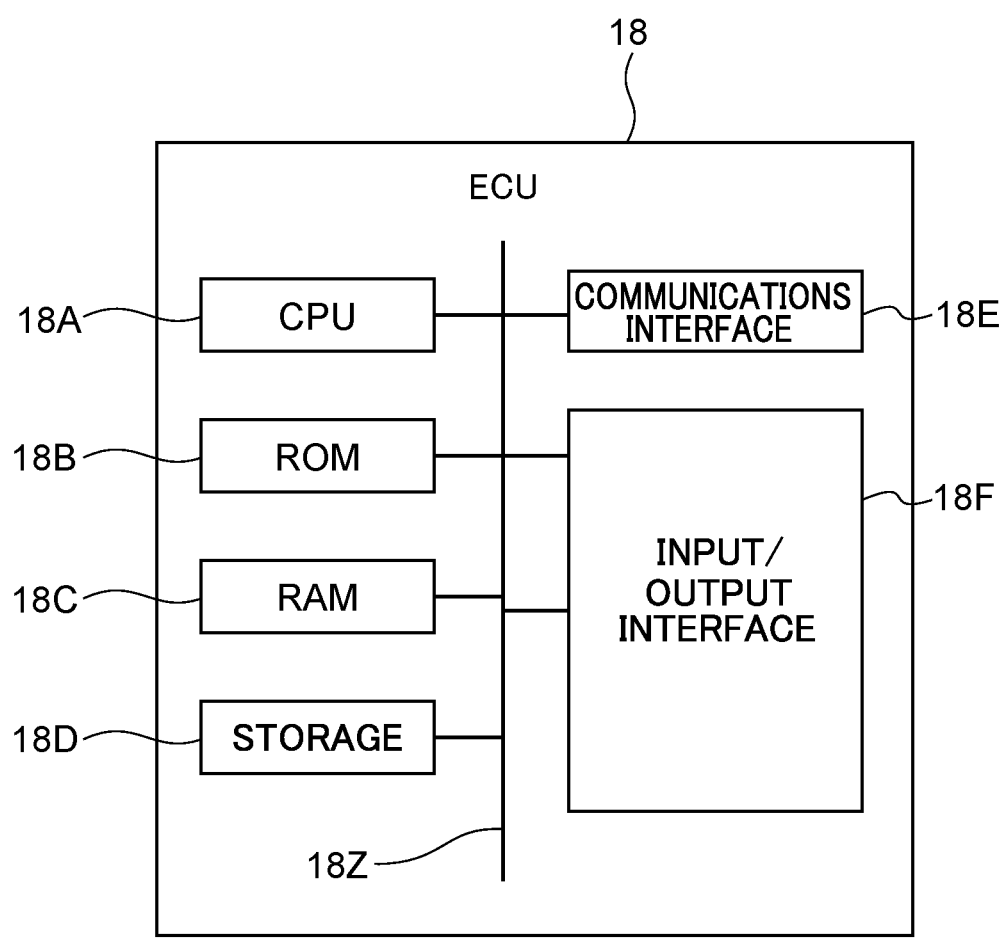
FIG. 2 is a control block diagram of an ECU (a gateway) of the on-board equipment diagnostics device shown in FIG. 1.

As shown in FIG. 2, the ECU 18, which includes the functions of a gateway, includes a central processing unit (CPU, which is a processor) 18A, a read-only memory (ROM) 18B, a random access memory (RAM) 18C, a storage 18D, a communications interface (I/F) 18E, and an input/output interface 18F. The CPU 18A, ROM 18B, RAM 18C, storage 18D, communications interface 18E and input/output interface 18F are connected with one another to be capable of communications via a bus 18Z. The ECU 18 is capable of acquiring information relating to times from a timer (not shown in the drawings). Each of the ROM 18B and the storage 18D is a non-volatile memory medium.

The CPU 18A is a central arithmetic processing unit that executes various programs and controls respective parts. That is, the CPU 18A reads a program from the ROM 18B or the storage 18D and executes the program, using the RAM 18C as a work area. The CPU 18A performs control of structures and various kinds of computational processing in accordance with programs recorded in the ROM 18B or storage 18D.

The ROM 18B stores various programs and various kinds of data. A power line diagnostics threshold map 15, which is illustrated in FIG. 7, a priority sequence map 17, which is illustrated in FIG. 8, and an ECU diagnostics threshold map 21, which is illustrated in FIG. 9, are recorded in the ROM 18B.

The power line diagnostics threshold map 15 represents threshold values of currents flowing through the first power line 28A and the second power line 28B. The thresholds prescribed by the power line diagnostics threshold map 15 are power line diagnostics thresholds for diagnosing whether or not there are abnormalities at the power lines. The power line diagnostic thresholds are current values for when the ECUs 20-1, 20-2, 20-3, 20-4 and 20-5 connected to the corresponding power lines are in the sleep state. The first threshold is a current value threshold for the first power line 28A when the switch 30B, switch 30C and switch 30D are positioned at the off positions. The current sensor 16 detects a current value of the first power line 28A at this time. The second threshold is a threshold for a sum of current values of the first power line 28A and the second power line 28B when the switch 30B is positioned at the on position and the switch 30C and switch 30D are positioned at the off positions. The current sensor 16 detects a sum of current values of the first power line 28A and second power line 28B at this time. For example, the first threshold is 2 mA (milliamperes) and the second threshold is 4 mA.

Priority sequences of the first power line 28A, second power line 28B, third power line 28C and fourth power line 28D prescribed by the priority sequence map 17 represent orders for implementing abnormality determination diagnostics, which is described below. For example, when the abnormality determination diagnostics is carried out for the ECUs 20 connected to the first power line 28A abnormality determination diagnostics of the ECU 20-1 is executed by the ECU 18 before abnormality determination diagnostics of the ECU 20-2 is carried out. The priority sequence according to the present exemplary embodiment is prescribed in accordance with power consumptions per unit time of the ECUs 20. More specifically, the greater the power consumption per unit time of each ECU 20, the higher the priority thereof.

The ECU diagnostics threshold map 21 represents threshold values of amounts of change in current values of currents flowing through the first power line 28A, second power line 28B, third power line 28C and fourth power line 28D when the ECU 18 transmits a wake-up frame (state switching signal) 19A or an idle state switching frame (state switching signal) 19B, which are described below. The thresholds prescribed by the ECU diagnostics threshold map 21 are ECU diagnostic thresholds for diagnosing whether or not each ECU 20 has an abnormality. The ECU diagnostics threshold map 21 prescribes a fifth threshold and a sixth threshold as the ECU diagnostic thresholds. The fifth threshold is an amount of change in a current value of current flowing through the first power line 28A or the second power line 28B when the ECU 20-1, 20-2, 20-3, 20-4 or 20-5 changes from the sleep state to the wake state. For example, the fifth threshold is 50 mA. The sixth threshold is an amount of change in a current value of current flowing through the third power line 28C or the fourth power line 28D when the ECU 20-6, 20-7, 20-8 or 20-9 changes from the non-idle state to the idle state. For example, the sixth threshold is 50 A (Amperes).

The RAM 18C serves as a work area and temporarily memorizes programs and data. The storage 18D is structured with a memory device such as a hard disk drive (HDD), a solid state drive (SSD) or the like. The storage 18D stores various programs and various kinds of data. The communications interface 18E is an interface for the ECU 18 to communicate with other equipment. The input/output interface 18F is an interface for communicating with equipment installed at the vehicle 12.

Figure 3:
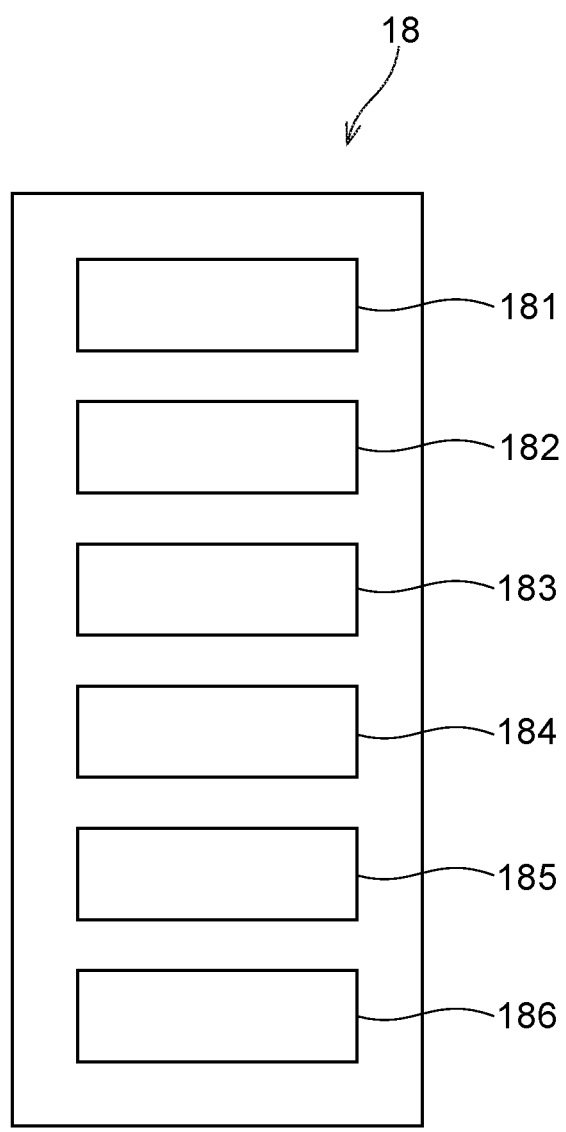
FIG. 3 is a functional block diagram of the ECU shown in FIG. 2.

FIG. 3 is a block diagram showing an example of functional structures of the ECU 18. As functional structures, the ECU 18 includes a message generation section 181, a transmission section 182, a reception section 183, a state determination section 184, an abnormality determination section 185 and a reset section 186. The message generation section 181, transmission section 182, reception section 183, state determination section 184, abnormality determination section 185 and reset section 186 are realized by the CPU 18A, which is an example of a processor (a computer), reading and executing a program memorized at the ROM 18B or storage 18D, which is an example of the non-transitory recording medium.

Figure 6:
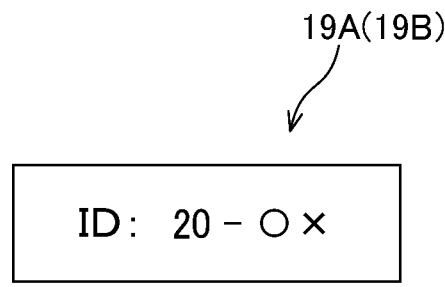
FIG. 6 is a diagram showing a wake-up frame or idle state switching frame generated by the ECU shown in FIG. 2.

The message generation section 181 generates the wake-up frames 19A and idle state switching frames 19B illustrated in FIG. 6. Information relating to an ID of the ECU 20 that is to receive a wake-up frame 19A or idle state switching frame 19B is appended to the wake-up frame 19A or idle state switching frame 19B. In the present exemplary embodiment, the ID of the ECU 20-1 is "20-1", the ID of the ECU 20-2 is "20-2", the ID of the ECU 20-3 is "20-3", the ID of the ECU 20-4 is "20-4", the ID of the ECU 20-5 is "20-5", the ID of the ECU 20-6 is "20-6", the ID of the ECU 20-7 is "20-7", the ID of the ECU 20-8 is "20-8" and the ID of the ECU 20-9 is "20-9". The ID information of the ECUs 20-1 to 20-5 is appended to the wake-up frames 19A. The ID information of the ECUs 20-6 to 20-9 is appended to the idle state switching frames 19B. Contents of the idle state switching frames 19B are mutually different between each of the respective IDs (of the ECUs 20-6 to 20-9).

The transmission section 182 is capable of transmitting the wake-up frames 19A and idle state switching frames 19B generated by the message generation section 181 to the first bus 32, the second bus 34, the third bus 36 and the fourth bus 38. As described below, when a wake-up frame 19A that is transmitted to the first bus 32, second bus 34 and third bus 36 by the transmission section 182 is received by the ECUs 20-1 to 20-5 that are in the sleep state, one of the ECUs 20-1 to 20-5 (a target ECU) with the same ID as in the wake-up frame 19A is switched into the wake state. When an idle state switching frame 19B that is transmitted to the second bus 34, third bus 36 and fourth bus 38 by the transmission section 182 is received by the ECUs 20-6 to 20-9 that are in the non-idle state, one of the ECUs 20-6 to 20-9 (a target ECU) with the same ID as in the idle state switching frame 19B is switched into the idle state.

The reception section 183 is capable of receiving signals transmitted by the ECUs 20 via the first bus 32, the second bus 34, the third bus 36 and the fourth bus 38.

The state determination section 184 determines, on the basis of signals received by the reception section 183 via the first bus 32, second bus 34, third bus 36 and fourth bus 38, which, of the wake state or the sleep state, each of the ECUs 20-1 to 20-5 is in, and which, of the idle state or the non-idle state, each of the ECUs 20-6 to 20-9 is in. For example, when one of the ECUs 20 is in the wake state or the non-idle state, the reception section 183 receives signals transmitted periodically by that ECU 20 via the first bus 32, second bus 34, third bus 36 or fourth bus 38. Accordingly, when these signals are detected, the state determination section 184 determines that the ECU 20 is in the wake state or the non-idle state. Alternatively, when the ECU 20 is in the sleep state or the idle state, the reception section 183 does not receive these signals. Accordingly, when the signals are not detected via the first bus 32, second bus 34, third bus 36 or fourth bus 38, the state determination section 184 determines that the ECU 20 is in the sleep state or the idle state.

The abnormality determination section 185 determines whether or not there is an abnormality at the first power line 28A and the second power line 28B. The abnormality determination section 185 also determines, on the basis of current values of the first power line 28A, second power line 28B, third power line 28C and fourth power line 28D detected by the current sensor 16 and the ECU diagnostics threshold map 21, whether or not the ECUs 20 receiving the wake-up frames 19A or idle state switching frames 19B from the transmission section 182 are in abnormal conditions.

Functions of the reset section 186 are described below.

Figure 4:
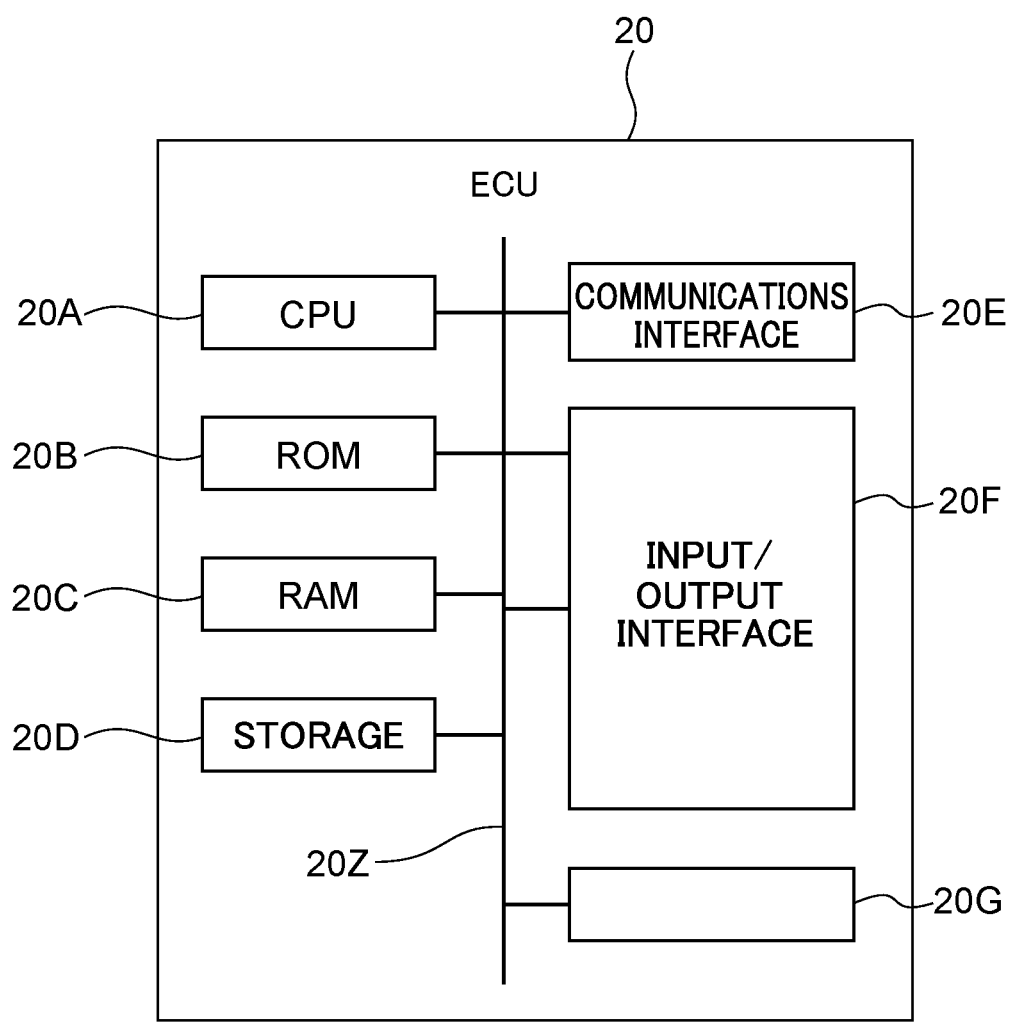
FIG. 4 is a control block diagram of another ECU of the on-board equipment diagnostics device shown in FIG. 1.

As shown in FIG. 4, each ECU 20 includes a CPU 20A, ROM 20B, RAM 20C, storage 20D, a communications interface 20E, an input/output interface 20F and the transceiver 20G. As shown in FIG. 4, the CPU 20A, ROM 20B, RAM 20C, storage 20D, communications interface 20E, input/output interface 20F and transceiver 20G are connected with one another to be capable of communications via a bus 20Z. The ECU 20 is capable of acquiring information relating to times from a timer (not shown in the drawings).

The transceiver 20G, which is a selective wake-up transceiver, operates regardless of the state of the ECU 20. That is, the transceiver 20G operates when the ECU 20 is in the wake state or the non-idle state and when the ECU 20 is in the sleep state or the idle state. The transceiver 20G receives the wake-up frames 19A and idle state switching frames 19B transmitted by the ECU 18 and recognizes the ID information appended to the frames.

Figure 5:
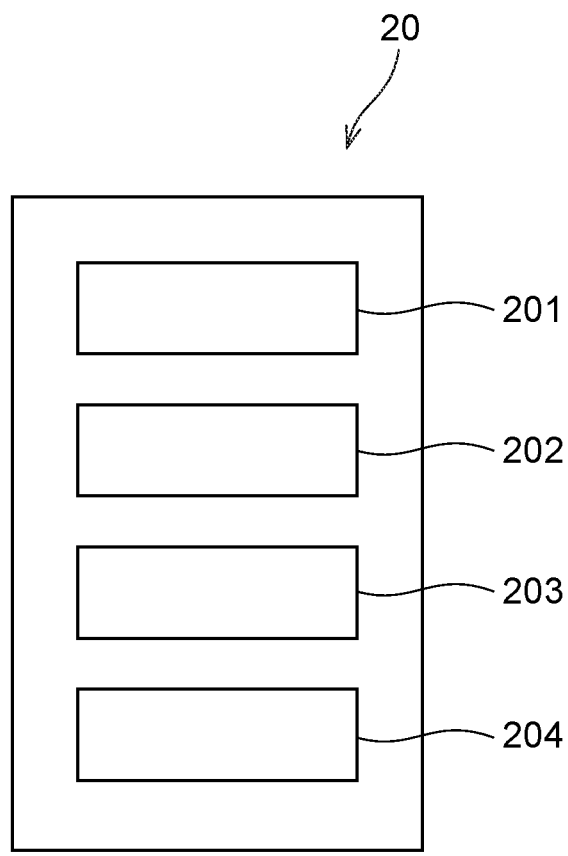
FIG. 5 is a functional block diagram of the ECU shown in FIG. 4.

FIG. 5 is a block diagram showing an example of functional structures of the ECU 20. As functional structures, the ECU 20 includes a signal generation section 201, a transmission section 202, a reception section 203 and a state control section 204. The signal generation section 201, transmission section 202, reception section 203 and state control section 204 are realized by the CPU 20A reading and executing a program memorized in the ROM 20B.

The signal generation section 201 generates predetermined signals.

The transmission section 202 transmits the signals generated by the signal generation section 201 to at least one of the first bus 32, second bus 34, third bus 36 or fourth bus 38.

The reception section 203 receives signals transmitted from control objects.

When the state control section 204 receives a wake-up frame 19A from the transceiver 20G, the state control section 204 switches the ECU 20-1, 20-2, 20-3, 20-4 or 20-5 from the sleep state to the wake state. When the state control section 204 receives an idle state switching frame 19B from the transceiver 20G, the state control section 204 switches the ECU 20-6, 20-7, 20-8 or 20-9 from the non-idle state to the idle state.

A diagnostics device 42 is detachably connected to the connector 26 shown in FIG. 1. The diagnostics device 42 is connected to the connector 26 in a state in which the ignition switch of the vehicle 12 is positioned at the off position. When an operator operates a control unit (not shown in the drawings) of the diagnostics device 42 connected to the connector 26, control signals are transmitted from the diagnostics device 42 to the ECU 18. When the control signals are received by the ECU 18, the ECU 18 executes processing that is described below (the processing in FIG. 10).

Figure 10:
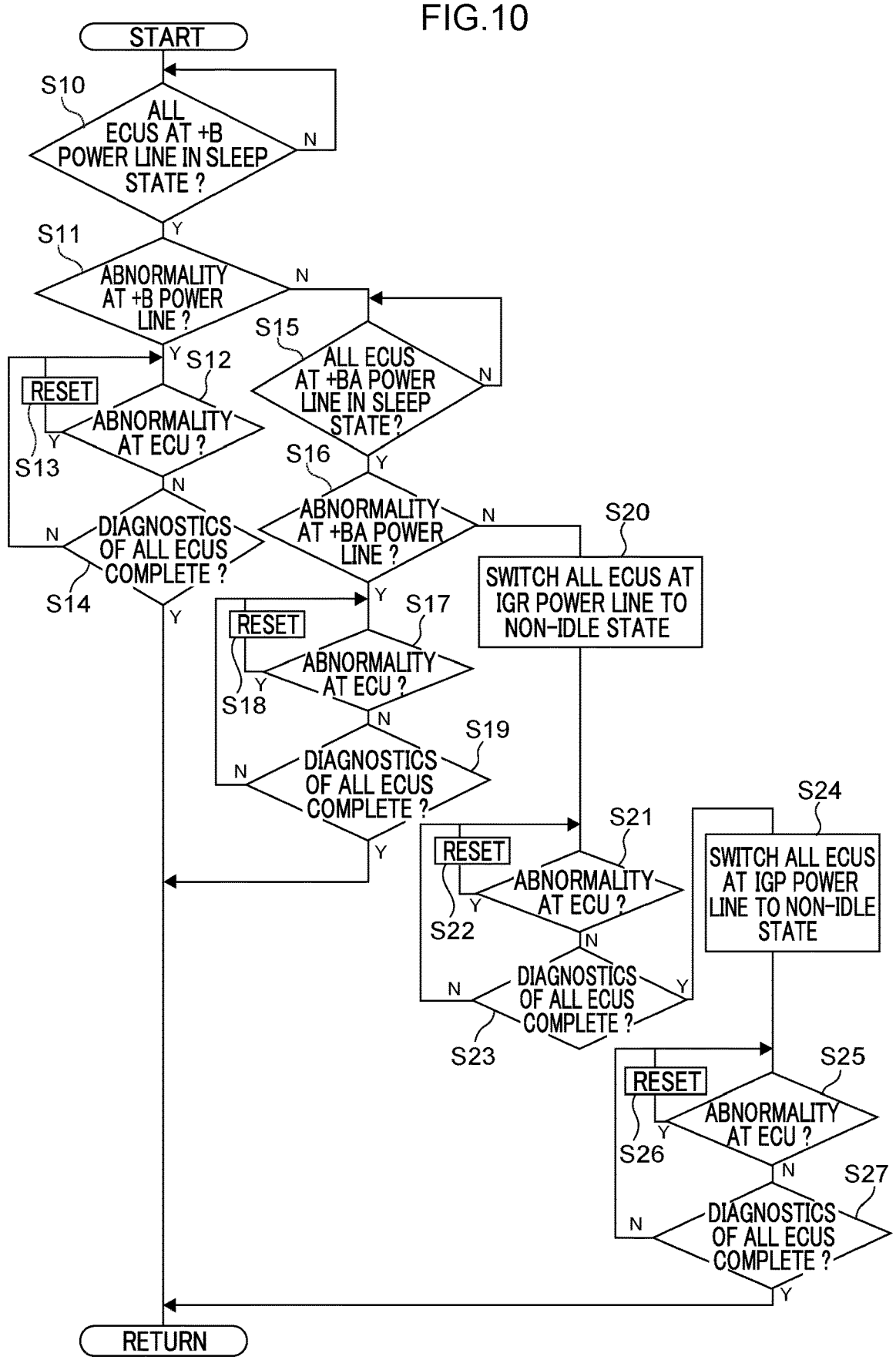
FIG. 10 is a flowchart depicting processing that is executed by the ECU shown in FIG. 2.

Now, a flow of the processing (diagnostics processing) that is carried out by the ECU 18 according to the present exemplary embodiment is described using the flowchart in FIG. 10. The following processing is executed in a state in which the ignition switch of the vehicle 12 is positioned at the off position, the smart key is disposed at a location that is separated from the vehicle 12 by more than the predetermined distance, and the diagnostics device 42 is connected to the connector 26. Therefore, at a time when the following processing starts, the switch 30B, switch 30C and switch 30D are positioned at the off positions. When the ECU 18 starts the diagnostics processing in accordance with control by the diagnostics device 42, the ECU 18 executes the processing of the flowchart in FIG. 10 repeatedly, each time a predetermined duration passes.

In step S10, on the basis of signals periodically transmitted by the ECU 20-1 and the ECU 20-2 to the first bus 32, the state determination section 184 of the ECU 18 makes a determination as to whether the ECU 20-1 and ECU 20-2 connected to the first power line 28A are in the sleep state.

When the result of the determination in step S10 is "Yes", the ECU 18 proceeds to step S11. When the result of the determination in step S10 is "No", the ECU 18 repeats the processing of step S10 until the result of the determination is "Yes".

When the ECU 18 proceeds to step S11, the abnormality determination section 185 of the ECU 18 refers to the power line diagnostics threshold map 15 illustrated in FIG. 7 and makes a determination as to whether there is an abnormality at the first power line 28A. If the ECU 20-1 and the ECU 20-2 are actually in the sleep state, functions of the ECU 20-1 and ECU 20-2 are halted apart from each transceiver 20G. Therefore, if the ECU 20-1 and ECU 20-2 are actually in the sleep state, a current value of current flowing through the first power line 28A is equal to or less than the first threshold (for example, 2 mA or less). Therefore, when the abnormality determination section 185 determines on the basis of signals received from the current sensor 16 that the current value of current flowing through the first power line 28A is not greater than the first threshold, the result of the determination in step S11 is "No" and the ECU 18 proceeds to step S15.

Alternatively, when the abnormality determination section 185 determines on the basis of signals received from the current sensor 16 that the current value of current flowing through the first power line 28A is greater than the first threshold, the result of the determination in step S11 is "Yes" and the ECU 18 proceeds to step S12. For example, if one or both of the ECU 20-1 and the ECU 20-2 is actually in the wake state, a large current is supplied to the one or both of the ECU 20-1 and the ECU 20-2, and the current value of the first power line 28A has a magnitude of 100 mA or more.

When the ECU 18 proceeds to step S12, the message generation section 181 of the ECU 18 refers to the priority sequence map 17 illustrated in FIG. 8 and conducts the abnormality determination diagnostics of the ECU 20-1 and the ECU 20-2. That is, the message generation section 181 conducts the abnormality determination diagnostics of the ECU 20-1 before conducting the abnormality determination diagnostics of the ECU 20-2. To be more specific, the message generation section 181 generates a wake-up frame 19A with the ID "20-1" and the transmission section 182 transmits this wake-up frame 19A to the first bus 32. The wake-up frame 19A transmitted to the first bus 32 is received by the transceiver 20G of the ECU 20-1 and the transceiver 20G of the ECU 20-2. Then the transceiver 20G of the ECU 20-1 sends the wake-up frame 19A to the state control section 204 of the ECU 20-1. As a result, the ECU 20-1 that is in the sleep state switches to the wake state. The transceiver 20G of the ECU 20-2 does not send the wake-up frame 19A to the state control section 204 thereof.

An amount of power supplied through the first power line 28A to the ECU 20-1 may not substantially change at this time. That is, an amount of change in the current value of the first power line 28A detected by the current sensor 16 may be less than the fifth threshold. In this case, it is assumed that the ECU 20-1 was in the wake state before the transmission section 182 transmits the wake-up frame 19A to the first bus 32. That is, it is assumed that the current value of the first power line 28A after the transmission section 182 transmits the wake-up frame 19A to the first bus 32 is around 100 mA and the current value of the first power line 28A prior to the transmission of the wake-up frame 19A was around 100 mA. Accordingly, it is determined by the abnormality determination section 185 that the ECU 20-1, which was determined to be in the sleep state by the state determination section 184 in step S10, was actually in the wake state. Thus, in this case, the abnormality determination section 185 determines that the ECU 20-1 is in an abnormal condition relating to the sleep state (and wake state). In this case, the result of the determination in step S12 is "Yes" and the ECU 18 proceeds to step S13.

When the ECU 18 proceeds to step S13, the reset section 186 of the ECU 18 generates a RAM initialization frame (not shown in the drawings). ID information representing the ID of a reset target ECU 20 is appended to the RAM initialization frame. In this case, the ID appended to the RAM initialization frame is "20-1". Also in step S13, the transmission section 182 transmits the generated RAM initialization frame to the ECU 20-1 and ECU 20-2 via the first bus 32. When each transceiver 20G of the ECU 20-1 and the ECU 20-2 receives the RAM initialization frame, the RAM 20C of the ECU 20-1 is initialized. Meanwhile, the RAM 20C of the ECU 20-2 is not initialized. Thus, the ECU 20-1 which was in the abnormal condition relating to the sleep state (and wake state) is normalized.

When the ECU 18 completes the processing of step S13, the ECU 18 proceeds to step S12, the state determination section 184 determines on the basis of signals periodically transmitted by the ECU 20-1 and ECU 20-2 to the first bus 32 that the ECU 20-1 and ECU 20-2 are in the sleep state, and then the message generation section 181 refers to the priority sequence map 17 and generates a wake-up frame 19A with the ID "20-2". The transmission section 182 transmits this wake-up frame 19A to the first bus 32. The wake-up frame 19A transmitted to the first bus 32 is received by the transceiver 200 of the ECU 20-1 and the transceiver 20G of the ECU 20-2. Then the transceiver 20G of the ECU 20-2 sends the wake-up frame 19A to the state control section 204. As a result, the ECU 20-2 which was in the sleep state switches to the wake state. The transceiver 20G of the ECU 20-1 does not send the wake-up frame 19A to the state control section 204 thereof.

When the ECU 20-2 that was in the sleep state switches to the wake state, an amount of electric power supplied through the first power line 28A to the ECU 20-2 may suddenly increase. For example, the current value of the first power line 28A detected by the current sensor 16 changes from around 1 mA to around 100 mA. That is, an amount of change in the current value of the first power line 28A detected by the current sensor 16 is equal to or more than the fifth threshold. In this case, the abnormality determination section 185 determines that the ECU 20-2, which was determined to be in the sleep state by the state determination section 184 in step S10, actually was in the sleep state. In other words, in this case, the ECU 20-2 is determined by the abnormality determination section 185 to be in a normal condition relating to the sleep state (and wake state). In this case, the abnormality determination section 185 determines "No" in step S12. That is, in this case the abnormality determination section 185 determines that the ECU 20-1 and the ECU 20-2 are in normal conditions.

When the result of the determination in step S12 is "No", the ECU 18 proceeds to step S14, and the abnormality determination section 185 makes a determination as to whether the diagnostics of the ECU 20-1 and ECU 20-2 that are connected to the first power line 28A are complete. When the result of the determination in step S14 is "Yes", the ECU 18 temporarily ends the processing illustrated in the flowchart.

As an example, when an electrical component (not shown in the drawings) fabricated by a different manufacturer from the manufacturer that fabricated the vehicle 12 is connected to a connector (not shown in the drawings) provided in the vehicle 12 and is connected to the battery 14, a current value of current flowing through the first power line 28A may be greater than the first threshold even though there is no abnormality at the ECU 20-1 and ECU 20-2. In this example, the result of the determination in step S11 is "Yes", the results of the determinations in step S12 are "No", and the result of the determination in step S14 is "Yes".

When the ECU 18 has completed the diagnostics of the ECU 20-1 and ECU 20-2, the ECU 18 carries out the processing of step S10 again. At this time, the result of the determination in step S10 is "Yes", the result of the determination in step S11 is "No", and the ECU 18 proceeds to step S15.

When the ECU 18 proceeds to step S15, the ECU 18 carries out similar processing to step S10 for the second power line 28B. That is, on the basis of signals transmitted periodically by the ECU 20-3 and ECU 20-4 to the second bus 34 and signals transmitted periodically by the ECU 20-5 to the third bus 36, the state determination section 184 makes a determination as to whether the ECU 20-3, ECU 20-4 and ECU 20-5 are in the sleep state.

When the result of the determination in step S15 is "Yes", the ECU 18 proceeds to step S16 and carries out similar processing to step S11 for the second power line 28B. First, the ECU 18 switches the switch 30B positioned at the off position to the on position. The abnormality determination section 185 of the ECU 18 refers to the power line diagnostics threshold map 15 illustrated in FIG. 7 and makes a determination as to whether there is an abnormality at the second power line 28B. That is, when the abnormality determination section 185 determines on the basis of signals received from the current sensor 16 that a sum of current values of the first power line 28A and second power line 28B is not greater than the second threshold, the result of the determination in step S16 is "No" and the ECU 18 proceeds to step S20.

Alternatively, when the abnormality determination section 185 determines on the basis of signals received from the current sensor 16 that the sum of current values of the first power line 28A and second power line 28B is greater than the second threshold, the result of the determination in step S16 is "Yes" and the ECU 18 proceeds to step S17.

When the ECU 18 proceeds to step S17, the message generation section 181 carries out processing similar to step S12 for the second power line 28B. That is, the ECU 18 refers to the priority sequence map 17 and conducts the abnormality determination diagnostics for the ECUs 20-4, 20-3 and 20-5 in this order. In the abnormality determination diagnostics of the ECU 20-4 and ECU 20-3, the transmission section 182 transmits wake-up frames 19A to the second bus 34. In the abnormality determination diagnostics of the ECU 20-5, the transmission section 182 transmits a wake-up frame 19A to the third bus 36.

When, as a result of the abnormality determination diagnostics of the ECU 20-4, the abnormality determination section 185 determines that the ECU 20-4 is in an abnormal condition relating to the sleep state (and wake state), the ECU 18 proceeds to step S18. In step S18, the reset section 186 of the ECU 18 generates a RAM initialization frame with the ID "20-4", and the transmission section 182 transmits the generated RAM initialization frame to the ECUs 20-3, 20-4 and 20-6 via the second bus 34. In this case, only the RAM 20C of the ECU 20-4 is initialized. Thus, the ECU 20-4 which was in the abnormal condition relating to the sleep state (and wake state) is normalized.

When the ECU 18 completes the processing of step S18, the ECU 18 proceeds to step S17 and conducts the abnormality determination diagnostics for the ECUs 20-3 and 20-5 in this order. When the result of the determination in step S17 is "Yes", the ECU 18 carries out the reset processing of step S18.

When the result of the determination in step S17 is "No", the ECU 18 proceeds to step S19, and the abnormality determination section 185 makes a determination as to whether the diagnostics of the ECU 20-3. ECU 20-4 and ECU 20-5 connected to the second power line 28B are complete. When the result of the determination in step S19 is "Yes", the ECU 18 temporarily ends the processing illustrated in the flowchart. At this time the ECU 18 switches the switch 30B positioned at the on position to the off position.

When the diagnostics of the ECU 20-3, ECU 20-4 and ECU 20-5 are complete, the ECU 18 carries out the processing of step S10 again. At this time, the result of the determination in step S10 is "Yes", the result of the determination in step S11 is "No", the result of the determination in step S15 is "Yes", the result of the determination in step S16 is "No", and the ECU 18 proceeds to step S20.

When the ECU 18 proceeds to step S20, the message generation section 181 of the ECU 18 generates non-idle state switching frames. Information relating to the IDs of the ECUs 20 is appended to the non-idle state switching frames. That is, in step S20, the message generation section 181 generates a non-idle state switching frame with the ID "20-6" and a non-idle state switching frame with the ID "20-7", and the transmission section 182 transmits these non-idle state switching frames to the second bus 34 and the fourth bus 38. As a result, the ECU 20-6 and ECU 20-7 switch into the non-idle state. In the present exemplary embodiment, when the ECUs 20-6, 20-7, 20-8 and 20-9 receive non-idle state switching frames, those ECUs switch from the idle state to the non-idle state or continue in the non-idle state. That is, there is no abnormality in switching functions of the ECUs 20-6, 20-7, 20-8 and 20-9 from the idle state to the non-idle state. In step S20, the ECU 18 also switches the switches 30B and 30C positioned at the off positions to the on positions.

When the ECU 18 completes the processing of step S20, the ECU 18 proceeds to step S21, and the message generation section 181 of the ECU 18 carries out processing similar to step S12 for the third power line 28C. That is, the ECU 18 refers to the priority sequence map 17 and conducts the abnormality determination diagnostics for the ECUs 20-7 and 20-6 in this order.

The message generation section 181 of the ECU 18 generates an idle state switching frame 19B with the ID "20-7" and the transmission section 182 transmits this idle state switching frame 19B to the fourth bus 38. The idle state switching frame 19B transmitted to the fourth bus 38 is received by each transceiver 20G of the ECUs 20-7 and 20-9.

An amount of power supplied through the third power line 28C to the ECU 20-7 may not actually change at this time. That is, an amount of change in a sum of current values of the first power line 28A, second power line 28B and third power line 28C detected by the current sensor 16 may be less than the sixth threshold. In this case, it is assumed that the ECU 20-7 is not switched from the non-idle state to the idle state in spite of the transceiver 20G of the ECU 20-7 receiving the non-idle state switching frame. In this case, it is assumed that current values of the third power line 28C before and after the transmission section 182 transmits the idle state switching frame 19B to the fourth bus 38 are both around 200 A. In this case, the abnormality determination section 185 determines that the ECU 20-7 is in an abnormal condition relating to switching from the non-idle state to the idle state. Therefore, the result of the determination in step S21 is "Yes" and the ECU 18 proceeds to step S22.

Meanwhile, the transceiver 20G of the ECU 20-9 does not send the idle state switching frame 19B to the state control section 204 thereof.

When the ECU 18 proceeds to step S22, the reset section 186 of the ECU 18 generates a RAM initialization frame with the ID "20-7", and the transmission section 182 transmits the generated RAM initialization frame to the ECUs 20-7 and 20-9 via the fourth bus 38. In this case, only the RAM 20C of the ECU 20-7 is initialized. Thus, the ECU 20-7 in the abnormal condition relating to switching from the non-idle state to the idle state is normalized.

When the ECU 18 completes the processing of step S22, the ECU 18 proceeds to step S21 and conducts the abnormality determination diagnostics for the ECU 20-6. The message generation section 181 of the ECU 18 generates an idle state switching frame 19B with the ID "20-6" and the transmission section 182 transmits this idle state switching frame 19B to the second bus 34. The idle state switching frame 19B transmitted to the second bus 34 is received by each transceiver 20G of the ECUs 20-3, 20-4 and 20-6. An amount of power supplied through the third power line 28C to the ECU 20-6 may suddenly decrease at this time. For example, an amount of change in the sum of current values of the first power line 28A, second power line 28B and third power line 28C detected by the current sensor 16 changes from around 200 A to around 100 A. That is, the amount of change in the sum of current values of the first power line 28A, second power line 28B and third power line 28C detected by the current sensor 16 is equal to or more than the sixth threshold. In this case, the abnormality determination section 185 determines that the ECU 20-6 is in a normal condition relating to switching from the non-idle state to the idle state. Therefore, the ECU 18 determines "No" in step S21.

When the result of the determination in step S21 is "No", the ECU 18 proceeds to step S23, and the abnormality determination section 185 makes a determination as to whether the diagnostics of the ECUs 20-6 and 20-7 connected to the third power line 28C are complete. When the result of the determination in step S23 is "Yes", the ECU 18 proceeds to step S24.

When the ECU 18 proceeds to step S24, the message generation section 181 of the ECU 18 generates a non-idle state switching frame with the ID "20-8" and a non-idle state switching frame with the ID "20-9". The transmission section 182 transmits these non-idle state switching frames to the third bus 36 and the fourth bus 38. As a result, the ECU 20-8 and ECU 20-9 go into the non-idle state. The ECU 18 also switches the switch 30D positioned at the off position to the on position. That is, the switches 30B, 30C and 30D are positioned at the on positions.

When the processing of step S24 is complete, the ECU 18 proceeds to step S25, and the message generation section 181 of the ECU 18 carries out processing similar to step S21 for the fourth power line 28D. That is, the ECU 18 refers to the priority sequence map 17 and executes the abnormality determination diagnostics for the ECUs 20-8 and 20-9 in this order. In the abnormality determination diagnostics of the ECU 20-8, the transmission section 182 transmits an idle state switching frame 19B to the third bus 36. In the abnormality determination diagnostics of the ECU 20-9, the transmission section 182 transmits an idle state switching frame 19B to the fourth bus 38.

When the result of the abnormality determination diagnostics for the ECU 20-8 is determined to be "Yes" in step S25, the ECU 18 proceeds to step S26. In step 26, the reset section 186 of the ECU 18 generates a RAM initialization frame with the ID "20-8", and the transmission section 182 transmits the generated RAM initialization frame to the ECUs 20-5 and 20-8 via the third bus 36. In this case, only the RAM 20C of the ECU 20-8 is initialized.

When the ECU 18 completes the processing of step S26, the ECU 18 proceeds to step S25 and conducts the abnormality determination diagnostics for the ECU 20-9. When the result of the determination in step S25 is "No", the ECU 18 proceeds to step S27. In step S27, the abnormality determination section 185 makes a determination as to whether the diagnostics of the ECUs 20-8 and 20-9 connected to the fourth power line 28D are complete. When the result of the determination in step S27 is "Yes", the ECU 18 temporarily ends the processing illustrated in the flowchart, and the ECU 18 switches the switches 30B, 30C and 30D positioned at the on positions to the off positions.

—Operation and Effects—

Now, operation and effects of the present exemplary embodiment are described.

In the diagnostics device 10 according to the present exemplary embodiment, when an amount of change in current values of the power lines 28 is less than the ECU diagnostics threshold prescribed in the ECU diagnostics threshold map 21 at the time of the message generation section 181 and transmission section 182 switching one of the ECUs 20 connected to the first power line 28A, second power line 28B, third power line 28C or fourth power line 28D into the first state (the wake state or the idle state), the abnormality determination section 185 determines that this ECU 20 is in an abnormal condition. Therefore, when any of the plural ECUs 20 connected to the first power line 28A, the second power line 28B, the third power line 28C or the fourth power line 28D with an abnormality relating to current values is in an abnormal condition, the diagnostics device 10 according to the present exemplary embodiment can identify the ECU(s) 20 in the abnormal condition(s) accurately. Furthermore, the diagnostics device 10 according to the present exemplary embodiment does not need to include dedicated circuits each of which is provided at each ECU 20 and has current sensors capable of measuring the size of dark currents flowing through the ECUs 20 and on/off switches allowing or blocking flows of electricity, in order to identify any ECU 20 in an abnormal condition.

In the diagnostics device 10 according to the present exemplary embodiment, the state determination section 184 of the ECU 18 determines, on the basis of signals transmitted from the ECUs 20-1, 20-2, 20-3, 20-4 and 20-5 via the first bus 32, second bus 34 and third bus 36, which, of the wake state or the sleep state, the ECUs 20-1, 20-2, 20-3, 20-4 and 20-5 are in. Then, the abnormality determination section 185 determines that a power line is the power line (a target power line) 28A or 28B with an abnormality relating to current values. All of the ECUs 20-1, 20-2, 20-3, 20-4 and 20-5 connected to this power line (the target power line) are in the sleep state and the current value of this power line is greater than the power line diagnostics threshold prescribed in the power line diagnostics threshold map 15. Thus, the diagnostics device 10 can accurately identify which of the first power line 28A and the second power line 28B has an abnormality relating to current values.

The diagnostics device 10 carries out abnormality determination diagnostics of each ECU 20 in accordance with a priority sequence prescribed by the priority sequence map 17. The priority sequence map 17 according to the present exemplary embodiment is prescribed based on the power consumptions per unit time of each ECU 20. Therefore, unnecessary consumption of large amounts of electricity due to neglect for a long period of an abnormal condition of an ECU 20 with a large power consumption per unit time may be prevented.

The reset section 186 of the ECU 18 resets an ECU 20 that is determined by the abnormality determination section 185 to be in an abnormal condition. Thus, the diagnostics device 10 according to the present exemplary embodiment may restore the ECU 20 that was determined to be in an abnormal condition to a normal condition.

In the diagnostics device 10 according to the present exemplary embodiment, after a determination by the abnormality determination section 185 and a reset by the reset section 186 are carried out for one of the ECUs 20, a determination by the abnormality determination section 185 and reset by the reset section 186 are carried out for another of the ECUs 20 that is connected to the same power line 28A, 28B, 28C or 28D as the ECU that has been reset. Thus, when one or more of the plural ECUs 20 connected to the power line 28A, 28B, 28C or 28D at which there is an abnormality relating to current values is in an abnormal condition, the diagnostics device 10 according to the present exemplary embodiment can prevent neglect for a long period of an abnormal condition of an ECU 20 determined to be in an abnormal condition.

The diagnostics device 10, vehicle 12, on-board equipment diagnostics method and non-transitory recording medium according to the present exemplary embodiment are described above, but the diagnostics device 10, vehicle 12, on-board equipment diagnostics method and non-transitory recording medium may be suitably modified within a technical scope not departing from the gist of the present disclosure.

For example, when one of the plural ECUs 20 connected to one or more of the second power line 28B, third power line 28C or fourth power line 28D is determined by the abnormality determination section 185 to be in an abnormal condition, the reset section 186 may simultaneously reset all of the ECUs 20 connected to the power line 28B, 28C or 28D by switching the switch 30B, 30C or 30D provided at the power line 28B, 28C or 28D that is determined to have an abnormal condition from the on position to the off position and then back to the on position. According to this variant example, when actually a plural number of the ECUs 20 connected to the power line 28B, 28C or 28D that has an abnormality relating to current values are in abnormal conditions, neglect for a long period of an abnormal condition of one ECU 20 that is determined by the abnormality determination section 185 to be in an abnormal condition and an abnormal condition of another of these ECUs 20 for which no determination is carried out by the abnormality determination section 185 but that is actually in an abnormal condition is prevented.

The priority sequence map 17 may prescribe a priority sequence based on lengths of sleep waiting durations of the ECUs 20-1 to 20-5. These sleep waiting durations are waiting periods for each ECU 20-1 to 20-5 in the wake state to switch into the sleep state. If execution prioritizes abnormality determination diagnostics of the ECUs 20-1 to 20-5 with short sleep waiting durations over the ECUs 20-1 to 20-5 with long sleep waiting durations, the abnormality detection diagnostics of the plural ECUs 20-1 to 20-5 that are connected to one power line may be executed in a shorter duration.

A diagnostics program may be installed at the ROM 18B of the ECU 18. This diagnostics program is launched, for example, when the ignition switch is switched from the on position to the off position, and causes the ECU 18 to execute the processing described above. In this variant example, the connector 26 and the diagnostics device 42 are not required.

All of the ECUs 20 may be ECUs 20 that switch between the wake state and the sleep state. Alternatively, all of the ECUs 20 may be ECUs 20 that switch between the non-idle state and the idle state.

Numbers of buses (the first bus 32, second bus 34, third bus 36 and fourth bus 38) and power lines (the first power line 28A, second power line 28B, third power line 28C and fourth power line 28D) may be any number that is at least one.

What is claimed is:

1. An on-board equipment diagnostics device comprising:
   a current measurement section that measures a current value of at least one power line connected to a battery mounted at a vehicle; and
   a processor, wherein the processor is configured to:
   by sending a state switching signal to a plurality of ECUs that are each connected to a corresponding power line of the at least one power line, switch one ECU at a time from a second state to a first state, and
   determine whether or not each ECU is in an abnormal condition based on current values of a target power line to which the ECU is connected, measured by the current measurement section when ECUs connected to the target power line are switched to the first state one at a time, each target power line being one of the at least one power line.

2. The on-board equipment diagnostics device according to claim 1, wherein each ECU connected to the target power line is switchable between a wake state that is the first state and a sleep state that is the second state, power consumption being less in the sleep state than in the wake state.

3. The on-board equipment diagnostics device according to claim 1, wherein each ECU connected to the target power line is switchable between an idle state that is the first state and a non-idle state that is the second state, power consumption being greater in the non-idle state than in the idle state.

4. The on-board equipment diagnostics device according to claim 1, wherein the processor is configured to determine that a target ECU, which is one of the ECUs connected to the target power line, is in an abnormal condition when an amount of change in current values of the target power line when the state switching signal is sent to the target ECU is less than a predetermined ECU diagnostics threshold.

5. The on-board equipment diagnostics device according to claim 1, wherein:
   each ECU connected to the target power line is switchable between a wake state that is the first state and a sleep state that is the second state, power consumption being less in the sleep state than in the wake state;
   the processor is configured to determine whether or not there is an abnormality relating to current values at the target power line based on current values measured by the current management section; and
   when the processor determines that there is an abnormality relating to current values at the target power line, the processor is configured to determine whether or not each ECU connected to the target power line is in an abnormal condition.

6. The on-board equipment diagnostics device according to claim 5, further comprising at least one bus connected to the plurality of ECUs, wherein the processor is configured to:
   determine whether each ECU is in the first state or the second state based on a signal sent from the ECU via the bus; and,
   when each ECU connected to one power line is determined to be in the second state and a current value of the one power line is greater than a predetermined power line diagnostics threshold, determine that the one power line is a target power line having an abnormality relating to current values.

7. The on-board equipment diagnostics device according to claim 1, wherein a priority sequence is specified for the plurality of ECUs connected to the target power line, and the processor is configured to determine whether or not each of the plurality of ECUs is in an abnormal condition in accordance with the priority sequence.

8. The on-board equipment diagnostics device according to claim 1, wherein, when one ECU is determined by the processor to be in an abnormal condition, the processor is configured to reset the one ECU in accordance with a reset process specified for the corresponding power line.

9. The on-board equipment diagnostics device according to claim 8, wherein, after the one ECU is determined to be in the abnormal condition and is reset by the processor, the processor is configured to perform the determination and reset for another ECU connected to a same target power line as the ECU that has been reset.

10. The on-board equipment diagnostics device according to claim 8, wherein, when the one ECU connected to the target power line is determined to be in the abnormal condition by the processor, the processor is configured to reset every ECU connected to the target power line simultaneously.

11. A vehicle comprising the on-board equipment diagnostics device according to claim 1.

12. An on-board equipment diagnostics method comprising, by a processor:
   by sending a state switching signal to a plurality of ECUs that are each connected to a corresponding power line of at least one power line connected to a battery mounted at a vehicle, switching one ECU at a time from a second state to a first state; and
   determining whether or not each ECU is in an abnormal condition based on current values of a target power line, to which the ECU is connected, when ECUs connected to the target power line are switched to the first state one at a time, each target power line being one of the at least one power line.

13. A non-transitory recording medium storing a program executable by a computer to perform processing comprising:
   by sending a state switching signal to a plurality of ECUs that are each connected to a corresponding power line of at least one power line connected to a battery mounted at a vehicle, switching one ECU at a time from a second state to a first state; and
   determining whether or not each ECU is in an abnormal condition based on current values of a target power line, to which the ECU is connected, when ECUs connected to the target power line are switched to the first state one at a time, each target power line being one of the at least one power line.

* * * * *